(12) United States Patent
Hocknell et al.

(10) Patent No.: US 8,279,417 B2
(45) Date of Patent: *Oct. 2, 2012

(54) LASER RANGE FINDER FOR USE ON A GOLF COURSE

(75) Inventors: Alan Hocknell, Carlsbad, CA (US); Matthew T. Cackett, San Diego, CA (US); Daniel M. Stevens, Cardiff, CA (US); Brandon T. Vincent, Tega Cay, SC (US)

(73) Assignee: Callaway Golf Company, Carlsbad, CA (US)

( * ) Notice: Subject to any disclaimer, the term of this patent is extended or adjusted under 35 U.S.C. 154(b) by 252 days.

This patent is subject to a terminal disclaimer.

(21) Appl. No.: 12/726,240

(22) Filed: Mar. 17, 2010

(65) Prior Publication Data

US 2010/0177298 A1    Jul. 15, 2010

Related U.S. Application Data

(63) Continuation of application No. 11/925,431, filed on Oct. 26, 2007, now Pat. No. 7,684,017.

(60) Provisional application No. 60/863,084, filed on Oct. 26, 2006.

(51) Int. Cl.
*G01C 3/08* (2006.01)
(52) U.S. Cl. .................... 356/5.01; 356/3.01; 356/4.01; 356/5.1
(58) Field of Classification Search ........ 356/3.01–3.15, 356/4.01–4.1, 5.01–5.15, 6–22, 28, 28.5, 356/139.01–139.1
See application file for complete search history.

(56) References Cited

U.S. PATENT DOCUMENTS

| | | | |
|---|---|---|---|
| 101,773 A | 4/1870 | Sharp | |
| 219,741 A | 9/1879 | Leimer et al. | |
| 755,172 A | 3/1904 | Ryan | |
| 1,530,070 A | 3/1925 | Ransom | |
| 1,980,101 A | 11/1934 | Schneider | |
| 2,075,883 A | 4/1937 | Britsch | |
| 2,234,362 A | 3/1941 | Bernhardt | |
| 2,237,963 A | 4/1941 | Hawks | |
| 2,253,948 A | 8/1941 | Brown | |
| 2,352,644 A | 7/1944 | Linderman, Jr. et al. | |
| 2,364,787 A | 12/1944 | Harrison et al. | |
| D158,905 S | 6/1950 | Stalker | |
| 2,572,863 A | 10/1951 | Jaap | |
| 2,734,273 A | 2/1956 | Blindenbacher et al. | |
| 2,828,855 A | 4/1958 | Mosch | |
| 2,992,487 A | 7/1961 | Miller | |
| 3,109,654 A | 11/1963 | Comitz | |
| 3,150,372 A | 9/1964 | Groth, Jr. | |
| 3,156,211 A | 11/1964 | Mallory, Jr. | |
| 3,325,750 A | 6/1967 | O'Hearn et al. | |
| 3,409,368 A | 11/1968 | Fernandez | |
| 3,409,987 A | 11/1968 | New | |
| 3,464,770 A | 9/1969 | Schmidt | |
| 3,544,253 A | 12/1970 | Bloom et al. | |

(Continued)

*Primary Examiner* — Luke Ratcliffe
(74) *Attorney, Agent, or Firm* — Michael A. Catania; Sonia Lari; Rebecca Hanovice

(57) ABSTRACT

An improved range finder for use on a golf course. The improved range finder includes means for identifying the closest target in a field of view during a sweep operation of the field of view and means for presenting the distance of the closest target at the conclusion of the sweep operation of the field of view. The improved range finder preferably uses infrared light to detect a flagstick.

1 Claim, 4 Drawing Sheets

U.S. PATENT DOCUMENTS

| | | |
|---|---|---|
| 3,644,740 A | 2/1972 | Dobratz et al. |
| 3,652,161 A | 3/1972 | Ross |
| 3,680,958 A | 8/1972 | Von Boss |
| 3,688,408 A | 9/1972 | Smith et al. |
| 3,698,811 A | 10/1972 | Weil |
| 3,712,737 A | 1/1973 | Bitterlich et al. |
| 3,738,749 A | 6/1973 | Everest |
| 3,752,581 A | 8/1973 | Everest |
| 3,771,483 A | 11/1973 | Bond |
| 3,786,411 A | 1/1974 | Kurauchi et al. |
| 3,816,056 A | 6/1974 | Brown |
| 3,832,056 A | 8/1974 | Shipp et al. |
| 3,852,579 A | 12/1974 | Sohn et al. |
| 3,868,692 A | 2/1975 | Woodard et al. |
| 3,898,437 A | 8/1975 | Butler |
| 3,941,483 A | 3/1976 | Ferrin |
| 3,959,641 A | 5/1976 | Miller, Jr. et al. |
| 3,999,853 A | 12/1976 | Landon |
| D243,867 S | 3/1977 | Williams, Jr. |
| D244,435 S | 5/1977 | Wolfe |
| D247,452 S | 3/1978 | Kitay |
| 4,095,348 A | 6/1978 | Kramer |
| 4,136,394 A | 1/1979 | Jones et al. |
| 4,175,333 A | 11/1979 | Kramer |
| 4,214,242 A | 7/1980 | Colin |
| 4,226,529 A | 10/1980 | French |
| 4,259,592 A | 3/1981 | Frungel et al. |
| 4,263,719 A | 4/1981 | Murdoch |
| 4,289,397 A | 9/1981 | Itzkan et al. |
| 4,297,701 A | 10/1981 | Henriques |
| 4,303,243 A | 12/1981 | Wolfe |
| 4,346,989 A | 8/1982 | Gort et al. |
| 4,367,526 A | 1/1983 | McGeary et al. |
| 4,419,655 A | 12/1983 | May |
| 4,453,825 A | 6/1984 | Buck et al. |
| 4,466,283 A | 8/1984 | Osterhout |
| 4,480,310 A | 10/1984 | Alvarez |
| 4,527,894 A | 7/1985 | Goede et al. |
| 4,569,599 A | 2/1986 | Bolkow et al. |
| 4,571,085 A | 2/1986 | Anderson |
| 4,603,973 A | 8/1986 | Crow |
| 4,617,741 A | 10/1986 | Bordeaux et al. |
| 4,620,788 A | 11/1986 | Giger |
| 4,656,463 A | 4/1987 | Anders et al. |
| 4,656,476 A | 4/1987 | Tavtigian |
| 4,665,404 A | 5/1987 | Christy et al. |
| 4,668,100 A | 5/1987 | Murakami et al. |
| 4,672,194 A | 6/1987 | Kastendieck et al. |
| 4,696,111 A | 9/1987 | Gardner |
| 4,698,781 A | 10/1987 | Cockerell, Jr. |
| 4,699,507 A | 10/1987 | Etoh |
| 4,699,508 A | 10/1987 | Bolkow et al. |
| 4,703,444 A | 10/1987 | Storms, Jr. et al. |
| 4,731,613 A | 3/1988 | Endo et al. |
| 4,732,472 A | 3/1988 | Konig et al. |
| 4,744,272 A | 5/1988 | Leatherman |
| 4,751,512 A | 6/1988 | Longaker |
| 4,764,666 A | 8/1988 | Bergeron |
| 4,770,526 A | 9/1988 | Manhart et al. |
| 4,783,867 A | 11/1988 | Tsao |
| 4,787,739 A | 11/1988 | Gregory |
| 4,811,491 A | 3/1989 | Phillips et al. |
| 4,815,020 A | 3/1989 | Cormier |
| 4,819,174 A | 4/1989 | Furuno et al. |
| 4,839,926 A | 6/1989 | Choi |
| D302,102 S | 7/1989 | Amagaya |
| 4,854,045 A | 8/1989 | Schaub |
| 4,863,123 A | 9/1989 | Bernard et al. |
| 4,864,592 A | 9/1989 | Lee |
| 4,864,854 A | 9/1989 | Van Leemput |
| 4,870,687 A | 9/1989 | DeLeon |
| 4,894,655 A | 1/1990 | Joguet et al. |
| 4,906,092 A | 3/1990 | O'Meara |
| 4,906,825 A | 3/1990 | Wu |
| 4,910,677 A | 3/1990 | Remedio et al. |
| 4,948,246 A | 8/1990 | Shigematsu |
| 4,949,089 A | 8/1990 | Ruszkowski, Jr. |
| 4,977,509 A | 12/1990 | Pitchford et al. |
| 4,985,935 A | 1/1991 | Hur |
| 5,007,110 A | 4/1991 | Gilbert |
| 5,020,902 A | 6/1991 | Kits van Heyningen et al. |
| 5,025,520 A | 6/1991 | Watkins |
| 5,043,889 A | 8/1991 | Lucey |
| 5,044,634 A | 9/1991 | Dudley |
| 5,046,839 A | 9/1991 | Krangle |
| 5,056,106 A | 10/1991 | Wang et al. |
| 5,086,390 A | 2/1992 | Matthews |
| 5,094,452 A | 3/1992 | Hennigan |
| 5,095,430 A | 3/1992 | Bonito et al. |
| 5,124,898 A | 6/1992 | Chabria |
| 5,127,044 A | 6/1992 | Bonito et al. |
| 5,128,807 A | 7/1992 | Blackmon |
| 5,148,002 A | 9/1992 | Kuo et al. |
| 5,157,403 A | 10/1992 | Urkowitz |
| 5,175,936 A | 1/1993 | Sato |
| 5,191,792 A | 3/1993 | Gloor |
| 5,211,395 A | 5/1993 | Liao |
| D336,415 S | 6/1993 | Cheng |
| 5,221,956 A | 6/1993 | Patterson et al. |
| 5,245,537 A | 9/1993 | Barber |
| 5,261,820 A | 11/1993 | Slye et al. |
| 5,269,065 A | 12/1993 | Ida |
| 5,271,034 A | 12/1993 | Abaunza |
| 5,272,483 A | 12/1993 | Kato |
| 5,280,332 A | 1/1994 | Tocher et al. |
| 5,283,733 A | 2/1994 | Colley |
| 5,291,262 A | 3/1994 | Dunne |
| 5,311,271 A | 5/1994 | Hurt et al. |
| 5,313,376 A | 5/1994 | McIntosh |
| 5,313,596 A | 5/1994 | Swindler et al. |
| 5,313,712 A | 5/1994 | Curameng et al. |
| 5,319,548 A | 6/1994 | Germain |
| 5,319,617 A | 6/1994 | Sonoda |
| 5,324,028 A | 6/1994 | Luna |
| 5,326,095 A | 7/1994 | Dudley |
| D350,271 S | 9/1994 | Landy et al. |
| 5,359,404 A | 10/1994 | Dunne |
| 5,364,093 A | 11/1994 | Huston et al. |
| D354,237 S | 1/1995 | Ishizaka |
| 5,412,896 A | 5/1995 | Morgan |
| 5,430,952 A | 7/1995 | Betts |
| 5,434,789 A | 7/1995 | Fraker et al. |
| 5,442,529 A | 8/1995 | Hoover |
| 5,469,175 A | 11/1995 | Boman |
| 5,471,191 A | 11/1995 | Narita |
| 5,471,215 A | 11/1995 | Fukuhara et al. |
| 5,489,982 A | 2/1996 | Gramling et al. |
| 5,491,546 A | 2/1996 | Wascher et al. |
| D369,082 S | 4/1996 | Fells et al. |
| 5,504,312 A | 4/1996 | Morrison et al. |
| 5,507,485 A | 4/1996 | Fisher |
| 5,513,854 A | 5/1996 | Daver |
| 5,515,249 A | 5/1996 | Shiao |
| 5,519,642 A | 5/1996 | Kishimoto |
| 5,538,250 A | 7/1996 | Putz |
| 5,558,333 A | 9/1996 | Kelson et al. |
| 5,562,550 A | 10/1996 | Chartrand |
| 5,582,566 A | 12/1996 | Imasaka et al. |
| 5,591,088 A | 1/1997 | Bianco et al. |
| 5,611,615 A | 3/1997 | Jang |
| 5,616,903 A | 4/1997 | Springer |
| 5,617,597 A | 4/1997 | Reitz |
| 5,650,949 A | 7/1997 | Kishimoto |
| 5,658,210 A | 8/1997 | Cornell |
| 5,664,880 A | 9/1997 | Johnson et al. |
| 5,681,108 A | 10/1997 | Miller |
| 5,691,922 A | 11/1997 | McEwan et al. |
| 5,699,255 A | 12/1997 | Ellis et al. |
| 5,738,117 A | 4/1998 | Fontaine, Jr. |
| 5,740,077 A | 4/1998 | Reeves |
| 5,779,549 A | 7/1998 | Walker et al. |
| 5,779,566 A | 7/1998 | Wilens |
| 5,781,950 A | 7/1998 | Swinden et al. |
| 5,790,477 A | 8/1998 | Hauke |
| 5,791,002 A | 8/1998 | Gardiner et al. |
| 5,829,965 A | 11/1998 | Rubalcava |
| 5,845,228 A | 12/1998 | Uekawa et al. |

| | | | | | |
|---|---|---|---|---|---|
| 5,857,268 A | 1/1999 | Park | 6,144,619 A | 11/2000 | Reisman |
| 5,859,693 A | 1/1999 | Dunne et al. | 6,145,209 A | 11/2000 | Chang |
| 5,873,648 A | 2/1999 | Shiao | D435,141 S | 12/2000 | Reynolds |
| D406,509 S | 3/1999 | Rivera | 6,164,814 A | 12/2000 | Crow |
| D407,286 S | 3/1999 | Seber et al. | 6,171,199 B1 | 1/2001 | Cohodas et al. |
| D407,287 S | 3/1999 | Seber et al. | 6,178,377 B1 | 1/2001 | Ishihara et al. |
| 5,888,061 A | 3/1999 | Reynolds | 6,185,157 B1 | 2/2001 | Farine |
| D407,616 S | 4/1999 | Seber | D440,350 S | 4/2001 | Park |
| 5,916,277 A | 6/1999 | Dallas | 6,227,973 B1 | 5/2001 | Kikuchi |
| 5,917,436 A | 6/1999 | Endo et al. | 6,233,521 B1 | 5/2001 | Nomura |
| 5,919,245 A | 7/1999 | Nomura | 6,246,917 B1 | 6/2001 | Smith et al. |
| 5,933,224 A | 8/1999 | Hines et al. | 6,262,801 B1 | 7/2001 | Shibuya et al. |
| D413,504 S | 9/1999 | Kung | 6,273,582 B1 | 8/2001 | Taggart et al. |
| 5,949,679 A | 9/1999 | Born et al. | 6,275,774 B1 | 8/2001 | Baron, Sr. et al. |
| RE36,346 E | 10/1999 | Germain | 6,277,029 B1 | 8/2001 | Hanley, Jr. |
| 5,960,498 A | 10/1999 | Nabors et al. | 6,282,362 B1 | 8/2001 | Murphy et al. |
| 5,963,999 A | 10/1999 | Gardiner et al. | 6,282,802 B1 | 9/2001 | Iden |
| 5,964,131 A | 10/1999 | Seber et al. | 6,292,743 B1 | 9/2001 | Pu et al. |
| 5,971,750 A | 10/1999 | Ho | D448,685 S | 10/2001 | Gardiner et al. |
| 5,996,451 A | 12/1999 | Seber et al. | D449,009 S | 10/2001 | Gardiner et al. |
| 6,023,322 A * | 2/2000 | Bamberger ............... 356/5.01 | 6,296,579 B1 | 10/2001 | Robinson |
| 6,027,224 A | 2/2000 | Schnell | 6,324,467 B1 | 11/2001 | Machii et al. |
| 6,030,109 A | 2/2000 | Lobsenz | 6,356,839 B1 | 3/2002 | Monde et al. |
| 6,038,723 A | 3/2000 | Nabors et al. | 6,466,306 B1 | 10/2002 | Davis |
| 6,062,991 A | 5/2000 | Moriarty et al. | 6,603,407 B2 | 8/2003 | Endo et al. |
| 6,074,312 A | 6/2000 | Lyon et al. | 2001/0051851 A1 | 12/2001 | Suzuki et al. |
| 6,089,459 A | 7/2000 | Eisele et al. | 2002/0040271 A1 | 4/2002 | Park et al. |
| 6,111,541 A | 8/2000 | Karmel | 2006/0077375 A1* | 4/2006 | Vermillion et al. ......... 356/4.01 |
| 6,122,594 A | 9/2000 | Tamaki et al. | 2007/0206175 A1* | 9/2007 | Rai et al. ..................... 356/4.03 |
| 6,142,769 A | 11/2000 | Walker | | | |
| 6,144,308 A | 11/2000 | Dunne | | | |

* cited by examiner

LASER RANGE FINDER FOR USE ON A GOLF COURSE

CROSS REFERENCES TO RELATED APPLICATIONS

The present application is a continuation application of U.S. patent application Ser. No. 11/925,431 filed on Oct. 26, 2007, which claims priority to U.S. Provisional Patent Application No. 60/863,084, filed on Oct. 26, 2006, now abandoned.

STATEMENT REGARDING FEDERALLY SPONSORED RESEARCH OR DEVELOPMENT

Not Applicable

BACKGROUND OF THE INVENTION

1. Field of the Invention

The present invention relates to laser range finders. More specifically, the present invention relates to laser range finders used for determining distance on a golf course.

2. Description of the Related Art

For many, years, range finders have been used to determine the distance to a flagstick on a fairway of a golf course. With fairway distances of 200 hundred to 600 yards, the use of range finders by golfers has increased over the years. However, many commercially available range finders still lack certain necessary features that many golfers desire.

Gardiner et al., U.S. Pat. No. 7,125,145 discloses a multi-use tool including range finding capability.

Faulkner et al., U.S. Pat. No. 6,636,296, discloses a range finder using an image based distance measuring means.

For example, the power button often has to be continuously depressed during a "sweep" of the field of view to determine the distance to a flagstick.

Many range finders are unstable when hand held, adding to the difficulty in acquiring the target flagstick.

Some range finders only have a single magnification for optical viewing, and the single magnification is sometimes inadequate.

Many range finders lack a positive feedback when a target is acquired. Most range finders lack the capability of capturing and displaying the minimum distance measured during a sweep, especially when the minimum distance corresponds to the flagstick.

Many range finders fail to have an ergonomically appealing shape, adding to discomfort and the inability to properly use the range finder.

Thus, an improved range finder is desired to overcome the failures of the prior art.

BRIEF SUMMARY OF THE INVENTION

An improved laser-based range finder is disclosed herein.

One aspect of the present invention is a range finder for use on a golf course. The range finder includes a laser for emitting a laser beam to a flagstick to be measured, a detector for detecting a reflected light from the flagstick, a measuring part for calculating a distance to the flagstick on the basis of the reflected light detected by the detector, and a display capable of displaying the flagstick and the distance to the flagstick.

Another aspect of the present invention is a range finder which includes a housing, means for magnified optical viewing disposed within the housing, means for infrared target acquisition distance disposed within the housing, means for displaying the distance on the housing, and means for providing power.

The range finder further includes an electronic logic circuit for maintaining the activation of a distance acquisition feature for a period ranging from 1 to 30 seconds, 10 to 25 seconds or 20 seconds.

The range finder further includes means for variable magnification to acquire the target flagstick.

The range finder further includes means for recognizing an infrared signature of a flagstick and means for alerting a user of the range finder to the acquisition of the infrared signature of the flagstick.

The range finder further includes a signal processing software routine for recognizing an infrared signature of a flagstick and means for alerting a user of the range finder to the acquisition of the infrared signature of the flagstick.

The range finder further includes means for identifying the closest target in a field of view during a sweep operation of the field of view and means for presenting the distance of the closest target at the conclusion of the sweep operation of the field of view.

The range finder further includes means to minimize the vibration and shaking of the range finder during operation thereof.

The range finder further includes a gyroscopic based stabilization device for minimizing vibration of the range finder.

The range finder further includes means for changing a circular view to a narrow horizontal slit view of the flagstick during a sweep operation of the field of view.

The range finder further includes an ergonomically shaped hand interface that interfaces with the user's thumb and fore finger.

The range finder further includes a rotating and telescoping integrally attached leg disposed on the bottom of the housing, which is extendable to the ground during operation.

The range finder further includes a bracket for attachment to a support strut of a golf cart to provide stability to the range finder during operation thereof.

The range finder further includes a tripod or single leg extendable from a top portion of a golf bag which is removably connectable to the range finder for providing stability during operation of the range finder.

The range finder further includes a bracket that swivels for attachment to a support strut of a golf cart to provide stability to the range finder during operation thereof.

The range finder further includes an integrated digital camera.

The range finder further includes means for limiting the distance of the field of view of the range finder, the limiting means comprising increments of at least ten yards.

The range finder preferably uses infrared radiation to determine the distance from the range finder to a flagstick.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

Figure 1:
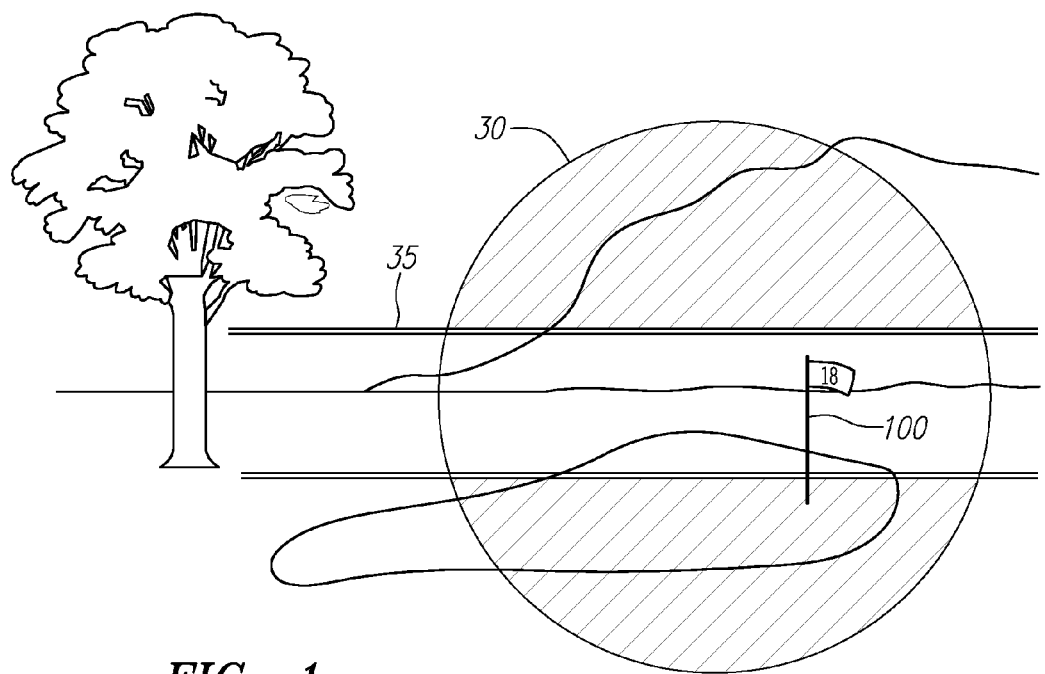
FIG. 1 is a view through a lens of the range finder illustrating the image modification feature which reduces the view from a circular view to a horizontal view focused on the flagstick.

As shown in FIGS. 1-8, a range finder is generally designated 25. In FIG. 1, a circular view 30 as seen through a display of the range finder 25 is changed into a horizontal slit view 35 once a flagstick 100 is located by the range finder 25 during a sweep operation of the field of view. A sweep is a general scan of the fairway to locate the flagstick 100.

Figures 2, 3:
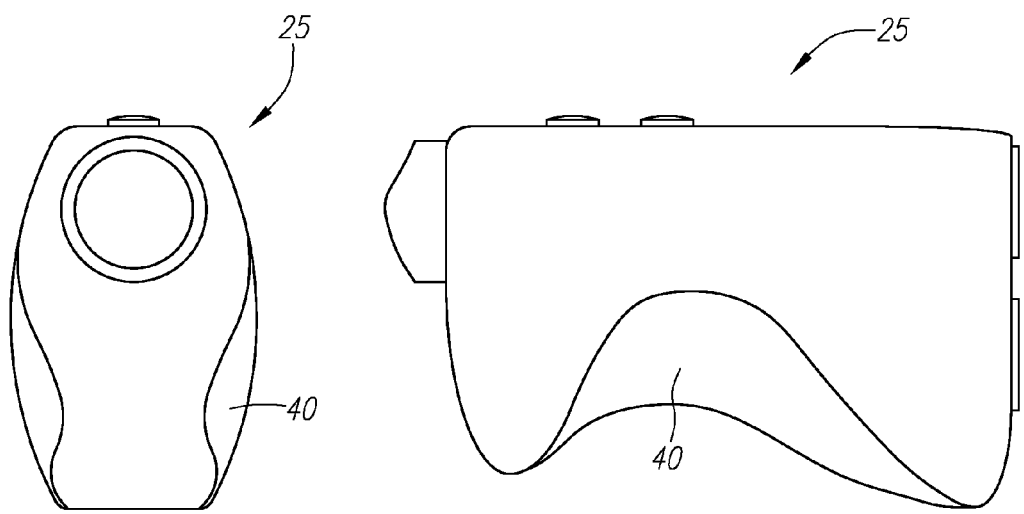
FIG. 2 is a back view of a range finder with an ergonomically shaped hand interface.
FIG. 3 is a side view of a range finder with an ergonomically shaped hand interface.

In FIGS. 2-3, an ergonomic hand interface 40 of the range finder 25 is illustrated. Those skilled in the pertinent art will recognize that other hand interfaces are within the scope and spirit of the present invention.

Figure 4:
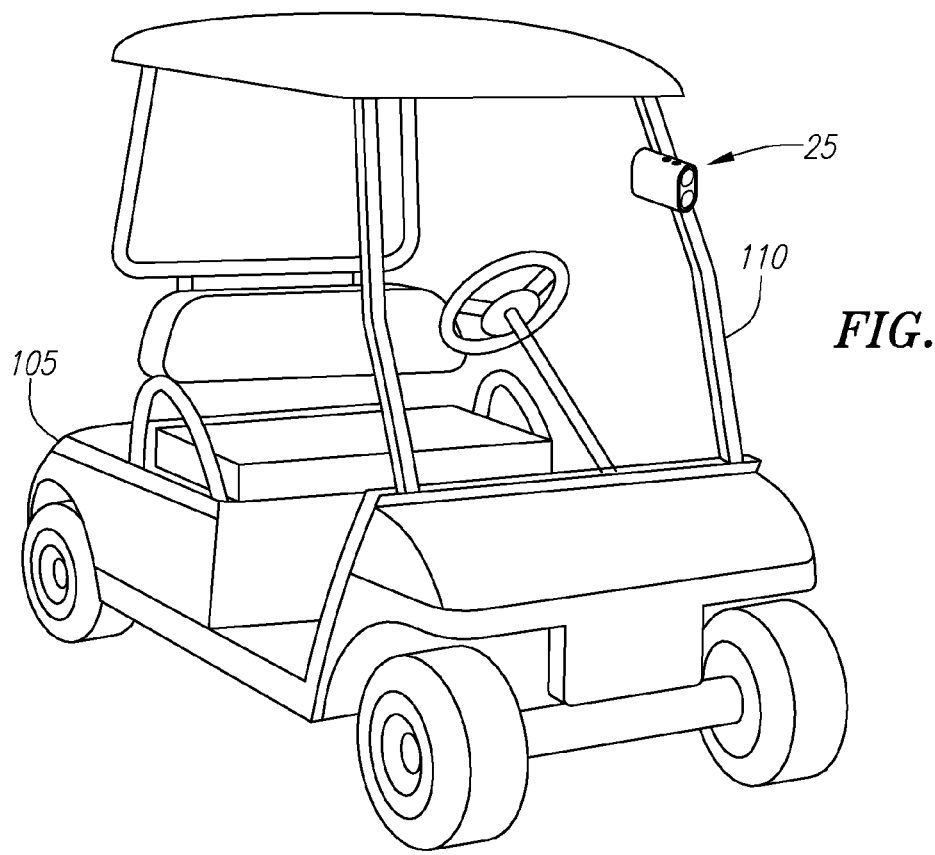
FIG. 4 is a perspective view of a golf cart with a range finder and attachment for stability and capable of swiveling outward from the cab of the golf cart.
Figure 5:
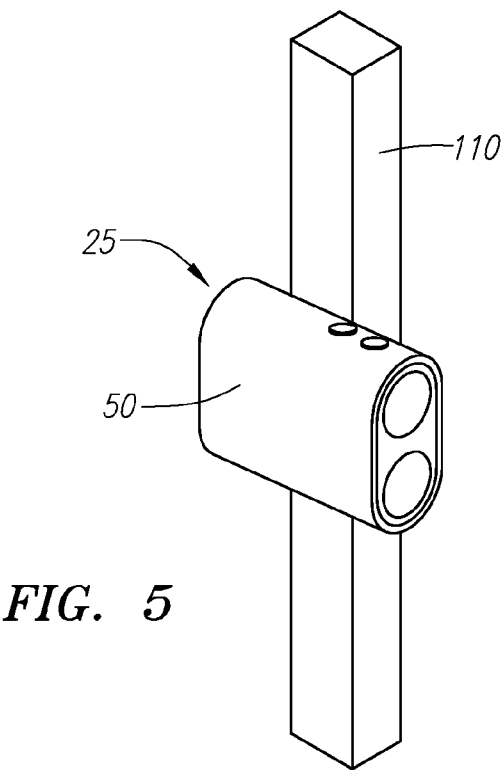
FIG. 5 is an enlarged view of the range finder and attachment for stability and capable of swiveling outward from the cab of the golf cart.

As shown in FIGS. 4-5, a golf cart 105 with a strut 110 has a range finder 25 attached to the strut 110 using an attachment means 50 such as a band, VELCRO material, a bracket or the like. This allows for greater stability during a sweep operation.

Figure 6:
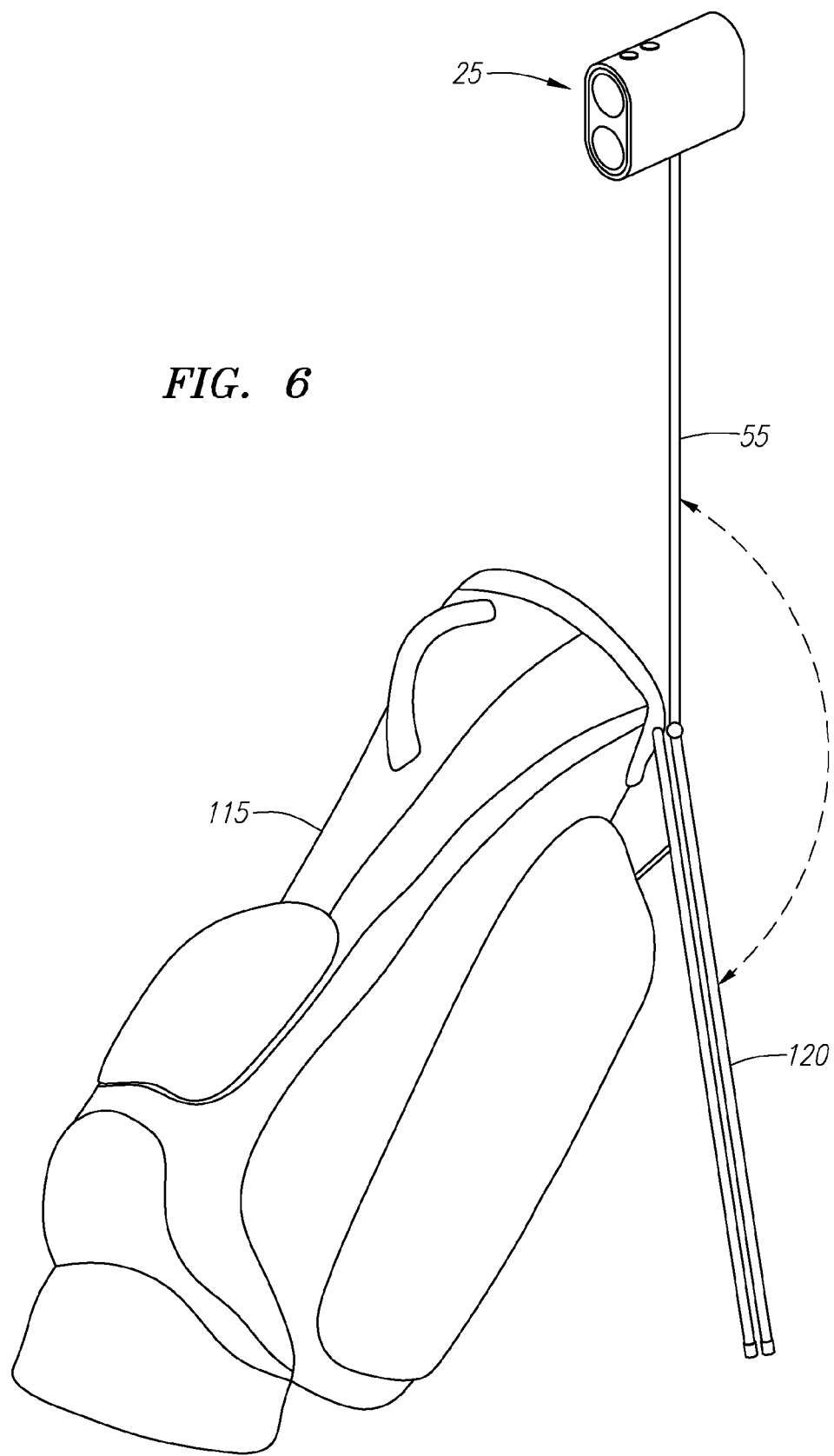
FIG. 6 is a front view of a golf bag with an extendable arm attached to a range finder.

As shown in FIG. 6, a golf bag 115 has a range finder 25 attached using a secondary strut 55 which may swivel from alignment with a leg 120 of the golf bag. The strut 55 allows for a stable sweep operation without the need for a completely extendable leg due to the height of the golf bag. Such a golf bag is available from Callaway Golf Company.

Figure 7:
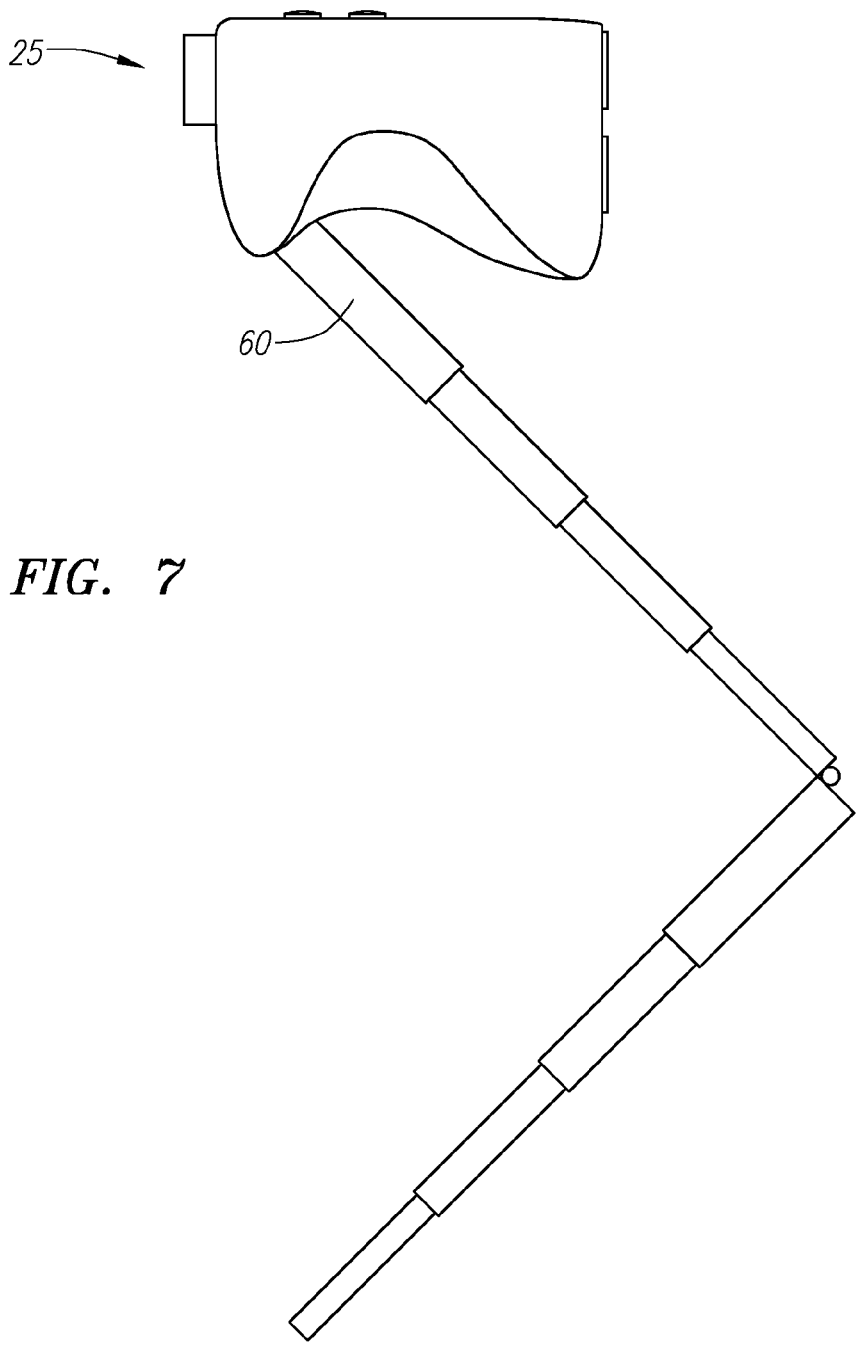
FIG. 7 is a side view of a range finder with an extendable leg in an extended position.
Figure 8:
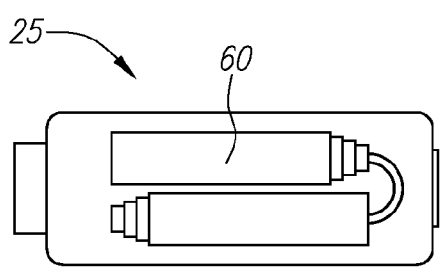
FIG. 8 is a bottom view of a range finder with an extendable leg in a retracted position.

As shown in FIGS. 7-8, a range finder 25 has a telescoping leg 60 which is retracted into a housing of the range finder 25 and extendable to the ground. The telescoping leg 60 has an extended length preferably ranging from 0.5 meter to 2.0 meters, 0.75 meter to 2.0 meters, and most preferably 1.5 meters.

The range finder 25 preferably uses infrared radiation to determine the distance from the range finder 25 to the flagstick 100 on a fairway of a golf course.

Haga, U.S. Pat. No. 6,583,860 for a Range Finder discloses a range finder that may be improved by the present invention, and Haga, U.S. Pat. No. 6,583,860 is hereby incorporated by reference in its entirety.

Dunne, U.S. Pat. No. 5,652,651 for a Laser Range Finder Having Selectable Target Acquisition Characteristics And Range Measuring Precision discloses a range finder that may be improved by the present invention, and Dunne, U.S. Pat. No. 5,652,651 is hereby incorporated by reference in its entirety.

Hines et al., U.S. Pat. No. 6,873,406 for a Tilt-Compensated Laser Rangefinder discloses a range finder that may be improved by the present invention, and Hines et al., U.S. Pat. No. 6,873,406 is hereby incorporated by reference in its entirety. Bamberger, U.S. Pat. No. 6,023,322 for a Laser Range Finder With Target Qualtiy Display And Scan Mode discloses a range finder that may be improved by the present invention, and Bamberger, U.S. Pat. No. 6,023,322 is hereby incorporated by reference in its entirety.

Feinbloom, U.S. Pat. No. 6,005,656 for a Flip-Up Range Finder Device discloses a range finder that may be improved by the present invention, and Feinbloom, U.S. Pat. No. 6,005,656 is hereby incorporated by reference in its entirety.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes, modifications and substitutions of equivalents may be made therein without departing from the spirit and scope of this invention which is intended to be unlimited by the foregoing except as may appear in the following appended claims. Therefore, the embodiments of the invention in which an exclusive property or privilege is claimed are defined in the following appended claims.

We claim as our invention:

1. A method for determining a distance to a flagstick on a golf course, the method comprising:

identifying a closest target in a field of view of a range finder during a sweep operation of the field of view;

presenting the distance of the closest target at the conclusion of the sweep operation of the field of view on a display of the range finder;

recognizing an infrared signature of a flagstick utilizing the range finder;

alerting a user of the range finder of an acquisition of the infrared signature flagstick;

magnifying an optical viewing of a display of the flagstick using an integrated camera disposed within the range finder, the integrated camera having variable magnification to acquire the flagstick;

emitting a laser beam to the flagstick to be measured, the laser beam emitted from a laser generator of a range finder;

detecting a reflected laser beam from the flagstick at a detector of the range finder;

calculating a distance to the flagstick on the basis of the reflected laser beam detected by the detector; and displaying the flagstick and the distance to the flagstick on the display of the range finder.

* * * * *